(12) United States Patent
Bugnano et al.

(10) Patent No.: US 9,770,130 B2
(45) Date of Patent: Sep. 26, 2017

(54) SYSTEM AND MACHINE FOR THE PREPARATION OF BEVERAGES USING CAPSULES

(71) Applicant: LUIGI LAVAZZA S.p.A., Turin (IT)

(72) Inventors: Luca Bugnano, Turin (IT); Alberto Cabilli, Moncalieri (IT); Alfredo Vanni, Chieri (IT)

(73) Assignee: LUIGI LAVAZZA S.P.A., Turin (IT)

( * ) Notice: Subject to any disclaimer, the term of this patent is extended or adjusted under 35 U.S.C. 154(b) by 487 days.

(21) Appl. No.: 14/372,806

(22) PCT Filed: Jan. 24, 2013

(86) PCT No.: PCT/IB2013/050619
§ 371 (c)(1),
(2) Date: Jul. 17, 2014

(87) PCT Pub. No.: WO2013/111088
PCT Pub. Date: Aug. 1, 2013

(65) Prior Publication Data
US 2014/0352546 A1    Dec. 4, 2014

(30) Foreign Application Priority Data
Jan. 25, 2012    (IT) .............................. TO2012A0061

(51) Int. Cl.
*B65B 29/02* (2006.01)
*A23F 5/26* (2006.01)
(Continued)

(52) U.S. Cl.
CPC ......... *A47J 31/407* (2013.01); *A47J 31/3628* (2013.01)

(58) Field of Classification Search
CPC ................ A47J 31/0663; A47J 31/3628; A47J 31/0668; A47J 31/407; A47J 31/0657; B65D 85/8046; B65D 85/8043
(Continued)

(56) References Cited

U.S. PATENT DOCUMENTS 9,113,744 B2 *  8/2015  Digiuni .............. B65D 85/8043
2010/0303965 A1  12/2010  Mariller
(Continued)

FOREIGN PATENT DOCUMENTS

DE    10 2009 049 943 A1    4/2011
EP       2 046 170 B1    10/2010
(Continued)

OTHER PUBLICATIONS

International Search Report of PCT/IB2013/050619 dated Apr. 17, 2013.
(Continued)

*Primary Examiner* — Omar Flores Sanchez
(74) *Attorney, Agent, or Firm* — Sughrue Mion, PLLC

(57) ABSTRACT

A system and machine for the preparation of beverages using capsules which includes a perforation device having an annular perforation member which, in the closed condition of the infusion chamber, extends into the interspace and is designed to cause a tear in the protruding portion of the wall of the capsule contained inside the chamber, such that a flow of pressurized water can be introduced into the capsule through the interspace or gap and the tear.

10 Claims, 9 Drawing Sheets

(51) Int. Cl.
*A47J 31/40* (2006.01)
*A47J 31/36* (2006.01)

(58) Field of Classification Search
USPC ..... 99/295; 426/433, 432, 77, 106, 122, 431
See application file for complete search history.

(56) References Cited

U.S. PATENT DOCUMENTS

2011/0142996 A1\* 6/2011 Kruger ............... B65D 85/8043
426/80
2012/0272830 A1 11/2012 Gugerli

FOREIGN PATENT DOCUMENTS

| EP | 2 335 529 A1 | | 6/2011 | | |
|----|----|----|----|----|----|
| EP | 2 141 093 B1 | | 8/2012 | | |
| GB | GB 2528289 A | \* | 1/2016 | ......... | B65D 85/8043 |
| WO | 2008/096385 A1 | | 8/2008 | | |
| WO | 2009/050540 A1 | | 4/2009 | | |

OTHER PUBLICATIONS

Written Opinion of the International Searching Authority of PCT/IB2013/050619 dated Apr. 17, 2013.

\* cited by examiner

SYSTEM AND MACHINE FOR THE PREPARATION OF BEVERAGES USING CAPSULES

CROSS REFERENCE TO RELATED APPLICATIONS

This is a National Stage of International Application No. PCT/IB2013/050619 filed Jan. 24, 2013, claiming priority based on Italian Patent Application No. TO2012A000061 filed Jan. 25, 2012, the contents of all of which are incorporated herein by reference in their entirety.

The present invention relates to a system for the preparation of beverages, in particular coffee, using prepackaged capsules.

More specifically, the invention relates to a system for the preparation of beverages comprising in combination:
- a capsule comprising a casing having first and second end walls interconnected by an annular side wall, and containing an amount or dose of a substance for preparation of the beverage; the side wall of the capsule having at least one portion which protrudes transversely towards the outside; and
- a machine comprising
- an infusion assembly inside which a capsule can be introduced and sealingly closed and which has, associated therewith,
- means for supplying a flow of pressurized water to be introduced into said capsule, and
- delivery means for outflow of the beverage formed in the infusion assembly towards a collecting container;
- the infusion assembly including a plurality of cooperating parts which can be moved away from and towards each other and can be sealingly coupled together so as to define as a whole an infusion chamber into which a capsule can be introduced;
- in at least one of said parts of the infusion assembly there being provided perforation means designed to perforate the capsule arranged in said chamber.

Systems of this type for the preparation of beverages are known per se and widely used, in particular for the preparation of espresso coffee.

Purely by way of example, such systems are described for example in EP-2,046,170 A1 and in WO 2008/096385 A1.

The prepackaged capsules which can be used for these systems may be of various types, for example of the type illustrated in the aforementioned documents or of the type described in the patent EP-2,141,093 B1, in the name of the same Applicant.

With such capsules, the introduction of pressurized hot water for the preparation of the beverage typically is performed at one of the two end faces of the capsule, and discharging of the beverage occurs at the other end face thereof.

The walls of the capsule through which, respectively, introduction of pressurized hot water and outflow of the beverage take place are of the type which may be perforated by means of special perforation or tearing devices which are known per se.

In these capsules, the annular side wall is absolutely impermeable and is in any case not perforated during preparation of the beverage.

With the capsules of the known type described above, for the purposes of optimum extraction of the beverage, it is important to ensure optimum wetting of the filtration panel formed by the dose of substance contained in the capsule.

For this purpose it is necessary to ensure that the entry of the pressurized hot water into the capsule takes place through a broad flow cross-section or area.

In the capsules of the abovementioned type, the maximum area for introduction of the water into the capsule corresponds at the most to the area of the end surface or wall, which is typically circular and through which the water is introduced.

Any increase in the diameter of this surface or wall, for the purposes of improving wetting of the substance contained in the capsule, is in practice not feasible since, with the internal volume of the capsule remaining the same, it involves a substantial reduction in the height of the capsule itself, with negative effects on the properties of the contact between the water and the substance contained in the capsule.

A first object of the present invention is therefore that of providing a system for the preparation of beverages which is able to overcome the abovementioned drawbacks associated with the characteristics of the capsules according to the prior art and allows in particular better wetting of the substance contained in the capsules.

A further object of the present invention is to provide a system in which perforation or tearing of the capsule may be performed using relatively simple and low-cost means.

In general, the objects of the present invention include that of achieving the following characteristic features of the capsule/dispensing machine system:
- ensuring that entry of the pressurized hot water into the capsule takes place through a broad flow cross-section or area;
- distributing the water flow rate among several inlets, without the fluid water streams having an excessive speed, this being a negative characteristic since it acts as an element which tends to break up the filtration panel of coffee or another substance contained in the capsule;
- obtaining perforation of the lateral sleeve of the capsule, which is usually made by means of thermoforming or injection moulding and is therefore particularly strong, using simple systems with repeatable characteristics; and
- ensuring interference between capsule and perforation element in a manner substantially coaxial with the axis of operation of the capsule loading/unloading mechanism so as to make the mechanical design of the entire dispensing unit very simple.

Moreover, in order for a system with lateral entry into the capsule of the beverage formation fluid to function correctly, the aforementioned entry part must be suitably connected to the beverage output channel, since the fluid would otherwise seek a preferential path where there is less pressure and would not pass through the capsule at all, resulting in the entire apparatus being unusable.

The present invention aims to solve this problem by providing a perimetral sealing edge which interacts with the machine, isolating the fluid entry and exit sections.

This object, together with other objects, is achieved according to the invention with a system for the preparation of beverages of the type initially defined, characterized in that:
- the infusion assembly is configured such that the infusion chamber is able to define, with respect to a capsule positioned therein, an annular interspace or gap in which said at least one transversely protruding portion of the side wall of the capsule extends; said annular interspace or gap being able to be connected to the pressurized water supply means and being separated in a liquid-tight manner from the beverage delivery means;

and in that the aforementioned perforation means comprise an annular perforation member which in the closed condition of the infusion chamber extends into said interspace or gap and is designed to cause a tear in said at least one transversely protruding portion of the side wall of a capsule contained inside said chamber, such that a flow of pressurized water can be introduced into the capsule through said interspace or gap and said at least one tear in the side wall thereof.

In one embodiment, the system envisages the use of a capsule, the side wall of which has a circumferential formation which protrudes transversely towards the outside, and the perforation means of the associated machine comprise an annular member having a plurality of cutting lugs or teeth which are angularly spaced and designed to cause a corresponding plurality of tears in said circumferential formation of the side wall of the capsule.

In this embodiment, the capsule used in the system may be of the type according to the patent EP-2,141,093 B1, previously mentioned, or similar types already known per se.

In another embodiment of the system, a capsule is used wherein the side wall thereof has a ring-like arrangement of formations transversely protruding towards the outside, in the manner of cells angularly spaced along the periphery thereof, and the perforation means of the machine therefore comprise an annular member having a circumferential cutting edge designed to tear said protruding formations of the side wall of the capsule.

In a further embodiment, the system may envisage the use of a capsule, the side wall of which has a circumferential formation transversely protruding towards the outside and, in an axially spaced relationship therewith, a circumferential ring-like arrangement of further formations protruding transversely towards the outside and angularly spaced, and the perforation means with which the machine is provided therefore comprise a first member having a plurality of cutting lugs or teeth which are angularly spaced and a second annular punch which has a circumferential cutting edge for tearing said transversely protruding circumferential formation and, respectively, said circumferential ring-like arrangement of further transversely protruding formations.

The invention also relates to a machine for the preparation of beverages, the main characteristic features of which are defined in claim 6.

Further characteristic features and advantages of the invention will become clear from the following detailed description provided purely by way of a non-limiting example, with reference to the accompanying drawings in which.

Figure 1:
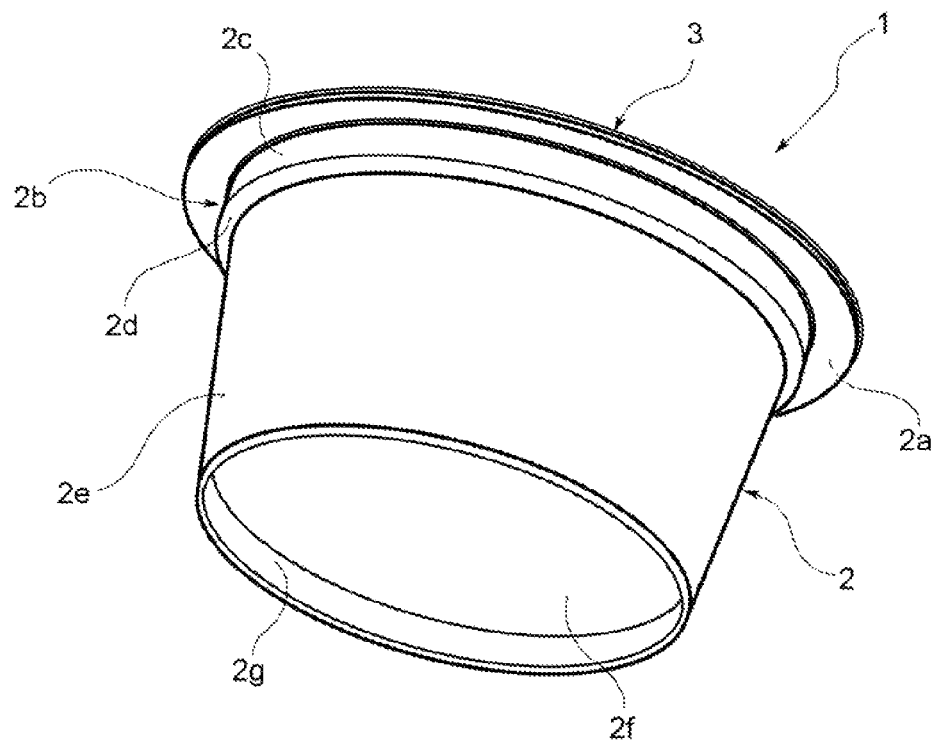
FIG. 1 is a perspective view of a capsule which can be used in a system for the preparation of beverages according to the present invention.

In FIG. 1, 1 denotes overall a capsule of the type known per se, for the preparation of a beverage, in particular espresso coffee, by means of pressurized extraction.

The capsule 1 may be of the sealed or non-sealed type and, in the example shown, comprises a cup-shaped body 2 which has at the top a flanged formation 2a which is essentially flat and protrudes radially towards the outside.

The body 2 is conveniently formed for example by a multilayer laminated structure, with an internal layer of polypropylene, an intermediate layer of EVOH (ethylene vinyl alcohol copolymer) and an external layer of polypropylene.

In the embodiment shown the body 2 of the capsule 1 has a side wall which, adjacent to the flange 2a, has a formation 2b which protrudes transversely towards the outside and which extends circumferentially over the entire periphery thereof.

In particular, starting from the flange 2a, the protruding formation 2b comprises an essentially cylindrical top portion 2c, followed by a stepped portion 2d where the diameter of the cross-section is reduced.

The side wall of the cup-shaped body 2 also has a frustoconical main wall portion 2e which is connected to the raised bottom wall 2f, forming an annular edge 2g protruding downwards.

The aforementioned configuration of the cup-shaped body 2 of the capsule 1 is however non-limiting. In particular, the cup-shaped body could have a bottom wall 2f which is not raised, the portion 2e could be cylindrical and the edge 2g could be dispensed with.

The capsule 1 also comprises a lid 3 (FIG. 1) connected to the flange 2a of the cup-shaped body 2, for example by means of heat-welding or ultrasound welding.

The lid 3 may be formed for example with a multilayer structure, including an internal layer made of polypropylene and an external layer made of aluminium.

Figure 2:
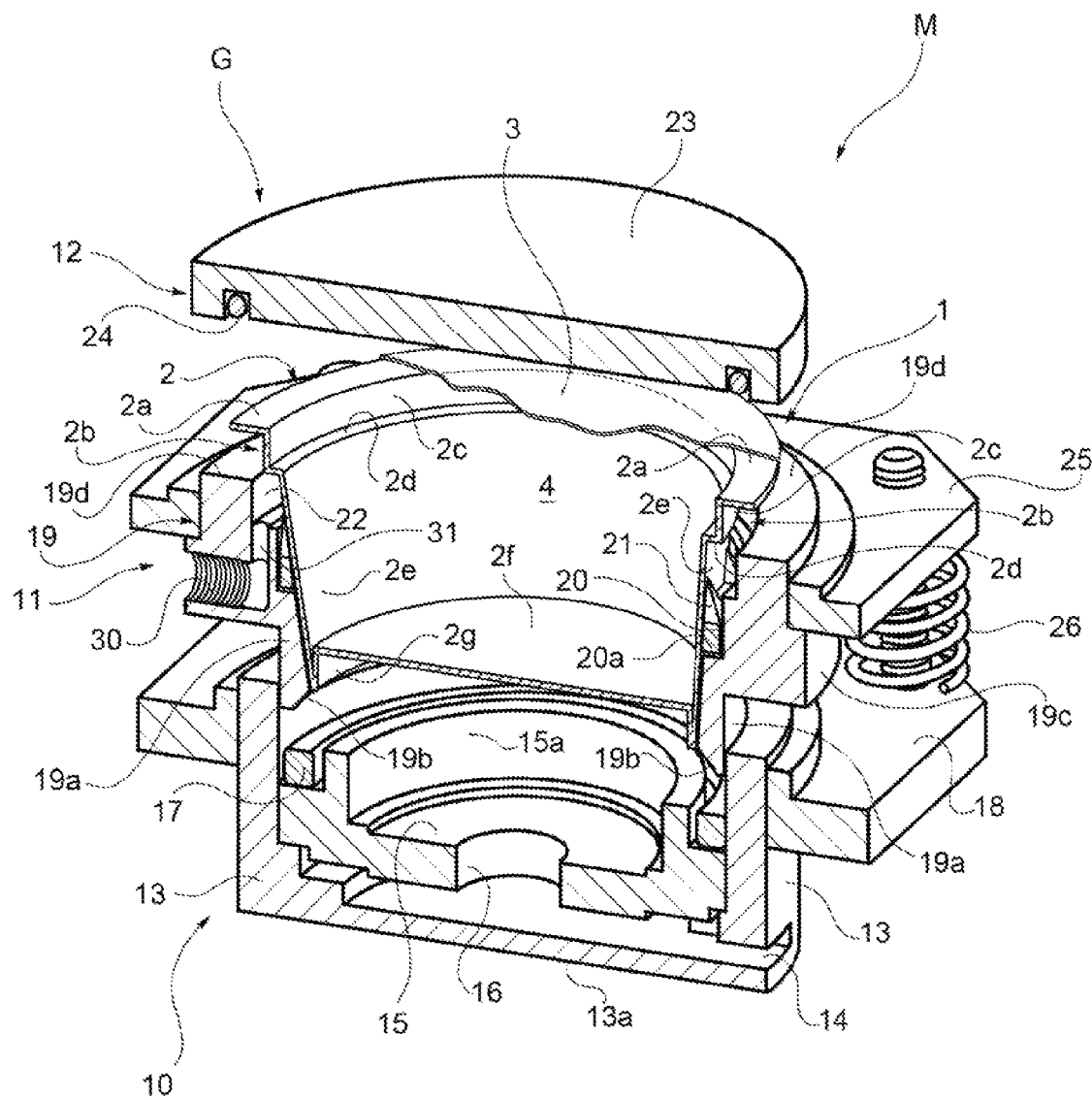
FIG. 2 is a partially exploded and partially sectioned perspective view which shows part of an infusion assembly of a machine which can be used in a system according to the invention.

Overall, the flexible lid 3 and the cup-shaped body 2 define a chamber indicated by 4 in FIG. 2.

The chamber 4 of the capsule 1 contains a quantity of material for preparation of a beverage, for example ground toasted coffee for the preparation of espresso coffee.

The preparation of a beverage using capsules of the type described above may be performed by means of pressurized extraction, using a machine, an embodiment of which will be described below, with particular reference to FIGS. 2 to 6.

As can be seen in particular in FIG. 2, a machine M according to the present invention comprises an infusion assembly denoted overall by G.

In the embodiment shown by way of example the infusion assembly G comprises essentially a bottom part 10, a middle part 11 and a top part 12.

The bottom part 10 of the infusion assembly G is preferably stationary, while the middle part 11 and top part 12 are movable with respect thereto, as will be described in greater detail below.

The bottom part 10 of the infusion assembly comprises a body 13, which is essentially cup-shaped and the bottom wall 13a of which has an outflow passage 14 formed therein.

An essentially annular shaped support element 15, provided with a central opening 16, is mounted inside the cup-shaped element 13, at a certain distance above its bottom wall 13a. This element 15 has at the top a raised annular formation 15a which extends upwards at a certain radial distance from the side wall of the cup-shaped body 13.

A toroidal sealing ring (O-ring) 17 is seated in the annular gap defined between the raised formation 15a and the side wall of the cup-shaped body 13.

The bottom part 10 of the infusion assembly G in the embodiment shown also comprises a plate 18, which is fixed around the side wall of the cup-shaped body 13.

The middle part 11 of the infusion assembly G is displaceable (vertically when viewing FIGS. 2 to 6) relative to the bottom part 10.

This middle part 11 essentially comprises an annular retaining body 19 which has a bottom portion 19a mounted slidably inside the top part of the cup-shaped body 13 of the bottom part 10.

The bottom edge of the portion 19a of the retaining body 19 has a conical chamfer 19b. This chamfered edge, during operation, may be wedged between the side wall of the cup-shaped body 13 and the sealing ring 17, causing radial compression of the latter towards the raised formation 15a of the support element 15, for purposes which will be clarified below.

The retaining body 19 has an intermediate portion 19c with, defined internally, an annular seat 20 inside which an annular perforation member 21 is arranged on a shoulder 20a. Said perforation member, as can be seen more clearly in FIG. 3, has at the top a ring-like formation of cutting lugs or perforating teeth 21a which are directed upwards and angularly spaced from each other.

The seat 20 of the element 19 communicates with an adjacent seat 22 (see in particular FIG. 2) which is defined in the top part of said element 19 and which emerges along the top annular edge 19d of this element 19.

The top part 12 of the infusion assembly G consists fundamentally of an essentially disc-shaped closing element 23 provided at the bottom with a groove which has, engaged inside it, a sealing ring 24 intended to press against the peripheral part of the lid 3 of a capsule 1 along the flange 2a thereof.

The closing element 23 is conveniently movable relative to the middle part 11, so as to allow the introduction of a capsule 1 into the retaining element 19 and the subsequent removal of the used capsule, following dispensing of the beverage produced with it.

25 denotes a fixed plate around the retaining element 19, lying essentially parallel to the plate 18 fixed to the cup-shaped body 13.

Springs 26 are arranged between the plates 18 and 25, these springs tending to push the plate 25 away from the plate 18 and therefore push the middle part 11 away from the bottom part 10 of the infusion assembly G.

The wall of the retaining element 19 is provided with a transverse passage 30, the radially innermost end of which communicates with a region inside this retaining element 19 via at least one longitudinal passage 31 (see in particular FIG. 2).

During operation, a capsule 1 is introduced inside the retaining element 19 when the top part 12 of the infusion assembly G is positioned at a distance from the middle part 11 thereof.

Figure 4:
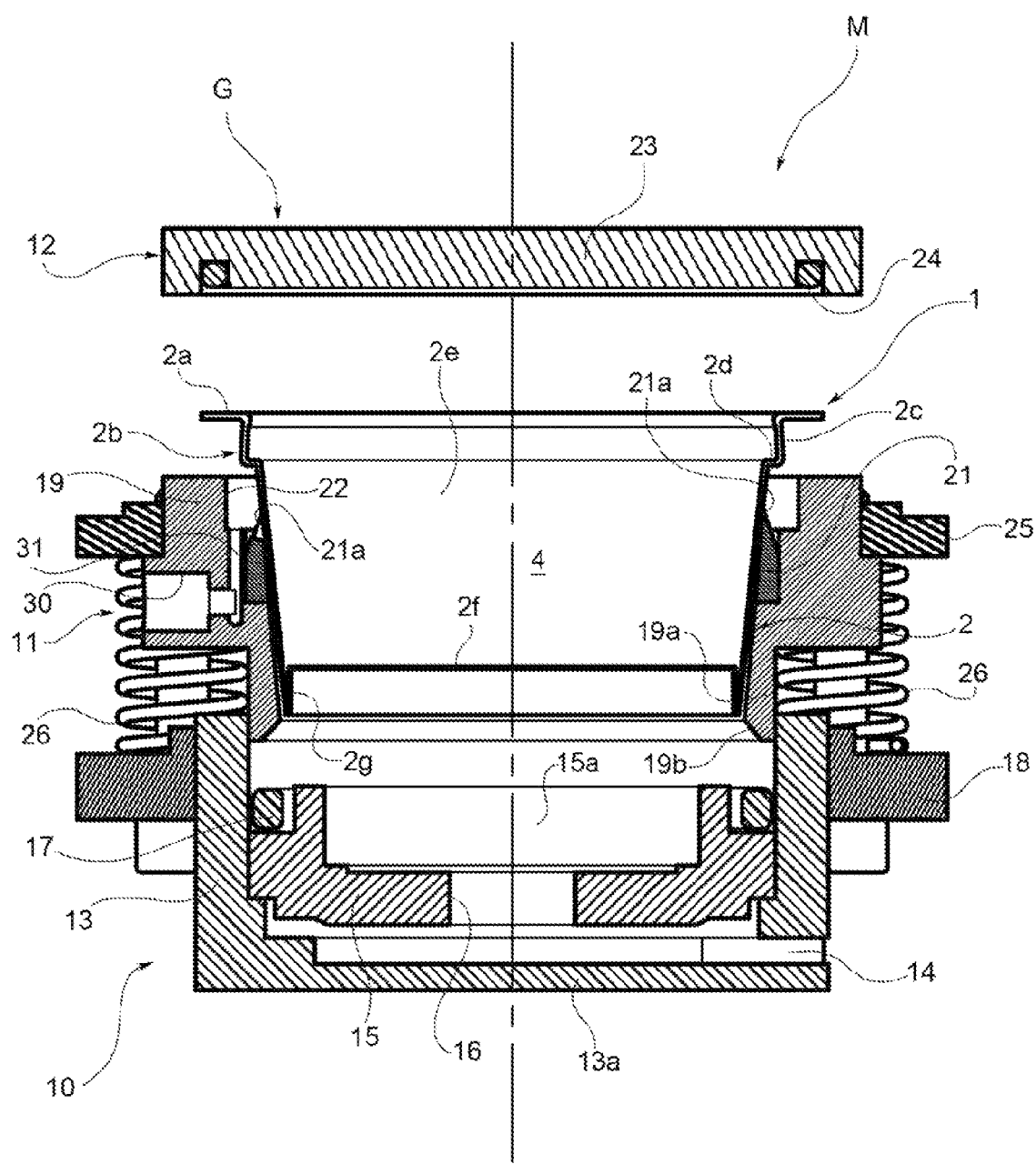
FIGS. 4 to 6 are partial cross-sectional views which show the infusion assembly according to FIG. 2 in three different conditions of a beverage preparation cycle using a capsule according to FIG. 1.

FIG. 4 shows a condition in which a capsule 1 has been introduced into the retaining element 19: in this condition, the side wall 2e of the body 2 of the capsule rests on the inner surface of the portion 19a of the retaining element 19, which portion conveniently has a substantially frustoconical form.

Figure 5:
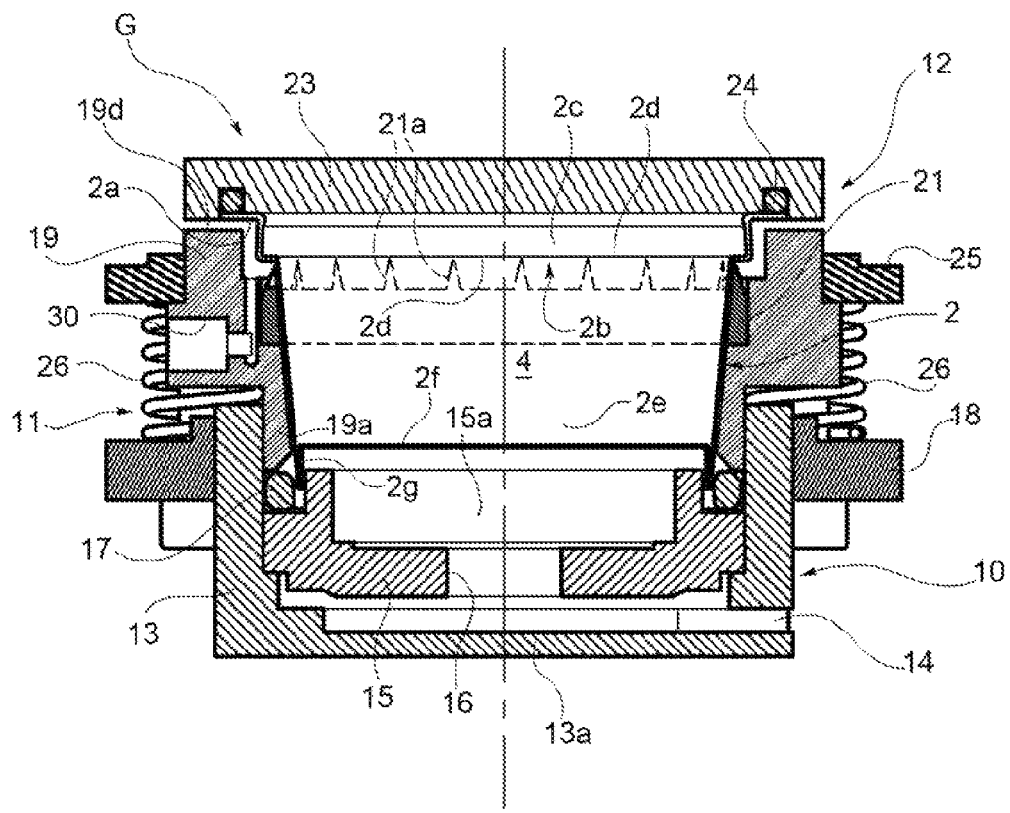

By means of mechanisms which are known per se, or in any case lie within the expertise of a person skilled in the art, the top part 12 of the infusion assembly G is brought into contact against the top edge 19d of the retaining element 19, as can be seen in FIG. 5.

Joining of the closing element 23 together with the retaining element 19 results in a further penetrating fit of the capsule 1 inside the retaining element 19: the flange 2a of the capsule 1 is arranged in contact against the top edge 19d of the retaining element 19, while the bottom edge 2g thereof is inserted between the O-ring 17 and the raised formation 15a of the support element 15, as can be seen in FIG. 5.

In this condition, the tips or ends of the teeth 21a of the perforation member 21 are arranged in the vicinity of the outer surface of the annular portion 2d of the side wall of the capsule 1, as can be seen in FIG. 5.

Figure 6:
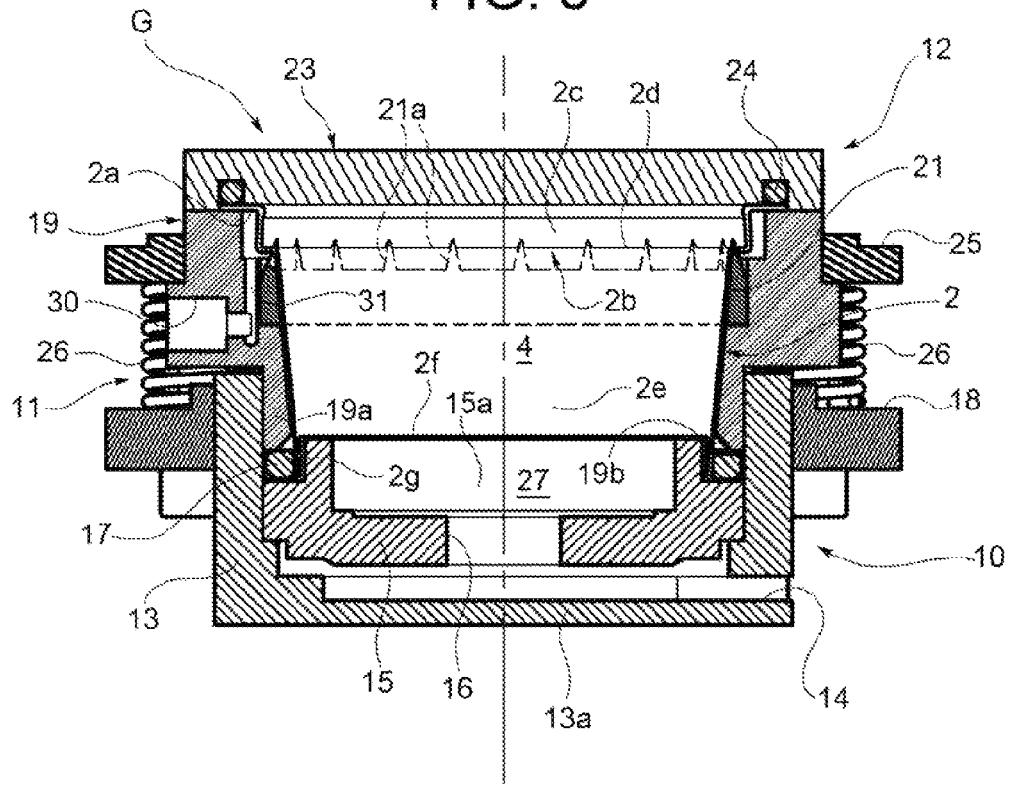

The assembly formed by the top part 12 and the middle part 11 of the infusion assembly G is then pushed further in the direction of the bottom part 10 of this assembly, compressing the opposition springs 26 until the middle portion 19c of the retaining element 19 comes into contact with the top edge of the cup-shaped body 13, as can be seen in FIG. 6.

In the condition shown in FIG. 6, the bottom edge 2g of the capsule is gripped between the raised formation 15a of the support element 15 and the O-ring 17. The latter is compressed against the outer surface of this edge 2g of the capsule owing to engagement thereof by the chamfered bottom edge 19b of the retaining element 19.

Owing to the action of the sealing elements 17 and 24, the annular chamber 20, 22, which inside the retaining element 19 is defined around the top part of the capsule, is sealed in a liquid-tight manner at the top and bottom.

The sealing ring 24 separates this annular chamber from the region outside the infusion assembly G, while the bottom sealing ring 17 separates this annular chamber from the region 27 situated underneath the capsule and from the outflow passage 14 (FIG. 6).

In the closed condition of the infusion assembly G shown in FIG. 6, a flow of pressurized hot water may be supplied into the aforementioned annular chamber 20, 22 via the passages 30 and 31. The pressurised hot water may therefore penetrate inside the capsule 1 through the plurality of tears formed in the wall 2d thereof by the tips 21a of the annular perforation member 21.

A plurality of streams of pressurized hot water are thus introduced into the capsule 1, these streams converging radially towards the axis of the capsule and gradually flowing downwards towards its bottom wall 2f.

This wall 2f may be of the type provided beforehand with micro-holes and in this case it allows the outflow of the beverage without having to be torn or perforated.

Alternatively, the bottom wall 2f of the body of the capsule 1 may be impermeable, but able to be torn as a result of the increase in the pressure inside the capsule.

According to a further alternative, in a manner not shown in the drawings, the region 27 situated underneath the bottom wall 2f of the capsule may be provided with a further perforation member, with raised zones or tips, intended to allow the tearing or perforation of this bottom wall 2f and the consequent outflow of the beverage.

In any case, the beverage flowing out of the capsule reaches, via the passage 16 in the support element 15, the outflow passage or channel 14 and may be dispensed towards a collecting container such as a cup or a glass.

Once dispensing of the beverage has been completed, the dispensing assembly G is opened again and its middle part 11 and top part 12 assume again the respective initial positions.

The used capsule 1 may be removed, for example by means of a spring expulsion device provided in the region 27 situated between this capsule and the support element 15.

FIGS. 7 to 12 show a variation of an embodiment of the system according to the invention.

In these figures, parts and elements already described have again been assigned the same reference numbers and letters used previously.

Figure 7:
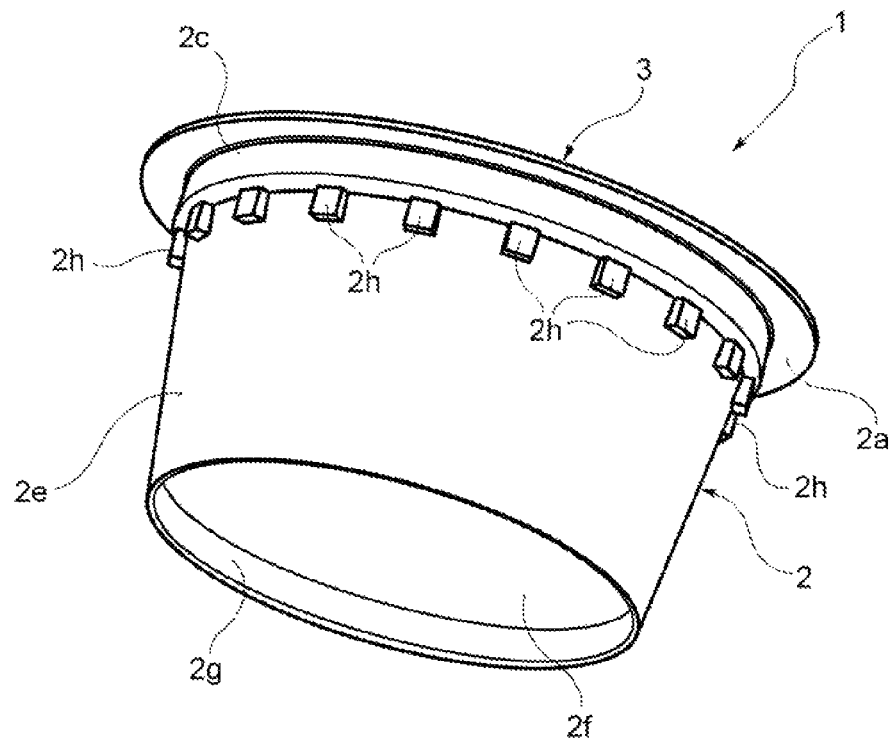
FIG. 7 is a perspective view of a further capsule which can be used in a system for the preparation of beverages according to the present invention.

The capsule 1 shown in FIG. 7 has a cup-shaped body 2 which, in the vicinity of its annular flange 2a, has a ring-like arrangement of formations 2h transversely protruding towards the outside, in the manner of cells, and angularly spaced along its periphery.

The capsule according to FIG. 7 is intended to be used with an infusion assembly G of the type which will now be described with reference to FIGS. 8 to 12.

Figure 9:
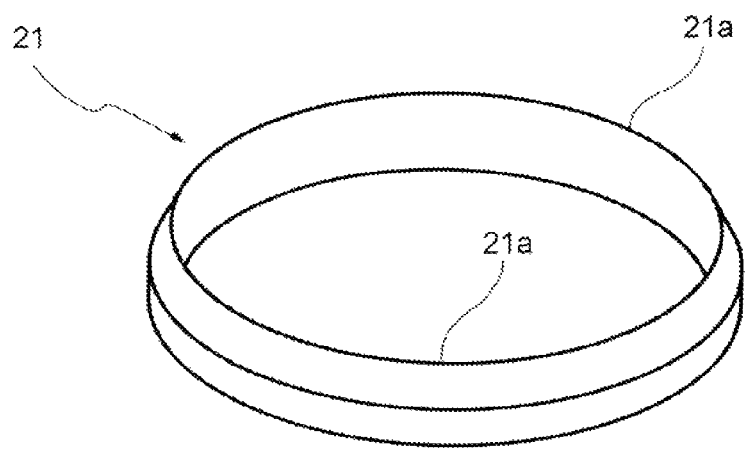
FIG. 9 is a perspective view of an annular cutting member which can be used in the infusion assembly according to FIG. 8.
Figure 8:
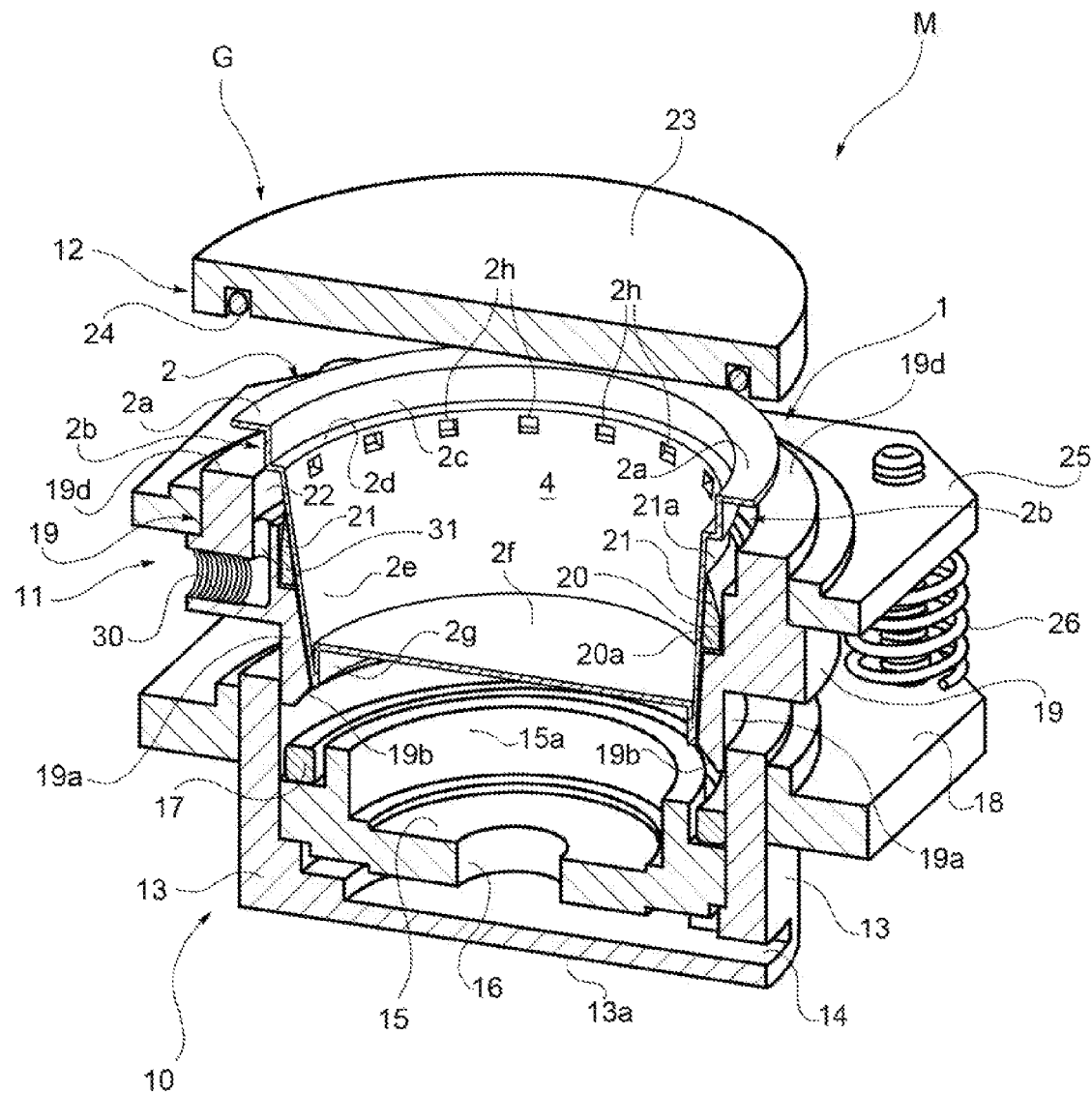
FIG. 8 is a partially exploded and partially sectioned perspective view of an infusion assembly which can be used in a machine for a system according to the invention, with a view to using capsules of the type according to FIG. 7.

This infusion assembly G corresponds mainly to that described above with reference to FIGS. 2 to 6 and differs from it essentially owing to the different form of the annular perforation member, which, as can be seen in FIG. 9, is now in the form of an annular knife 21, with a single cutting edge 21a directed upwards.

Figure 10:
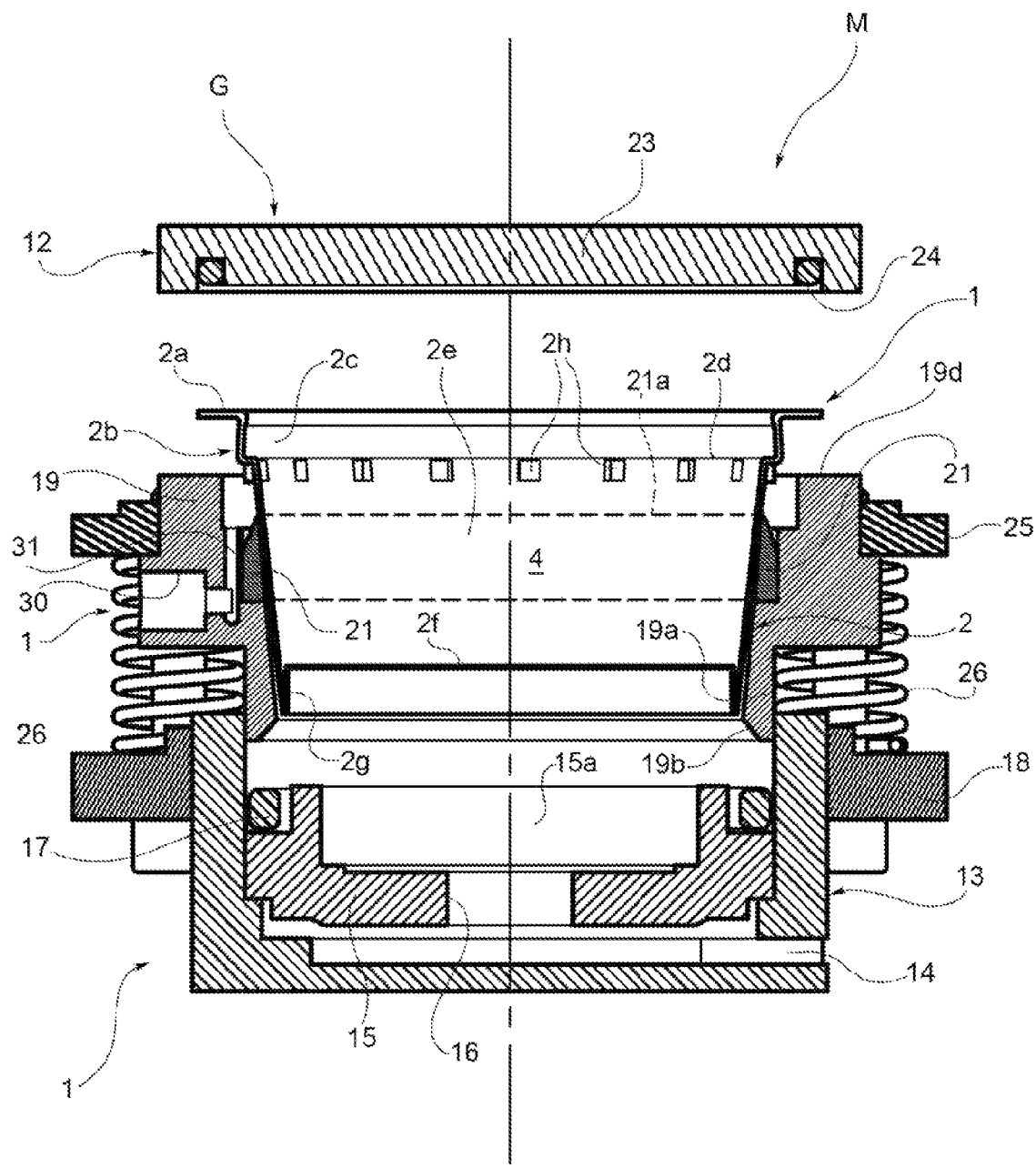
FIGS. 10 to 12 are axially sectioned views which show the infusion assembly according to FIG. 8 in three positions of a beverage preparation cycle using a capsule according to FIG. 7.
Figure 11:
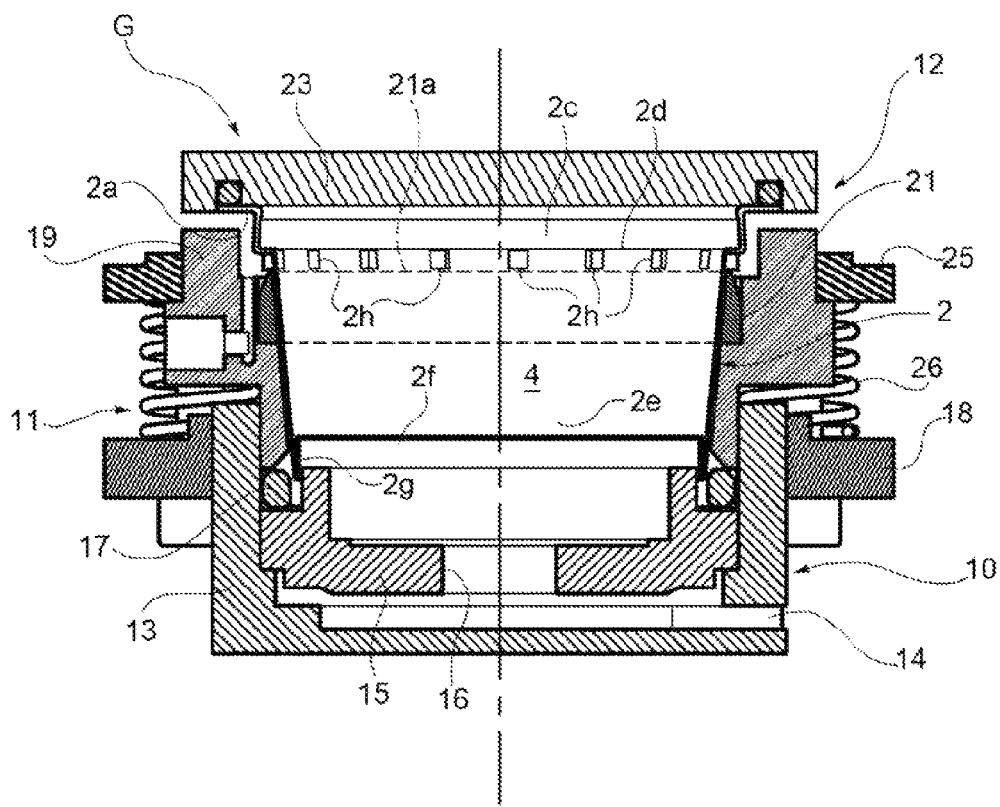
Figure 12:
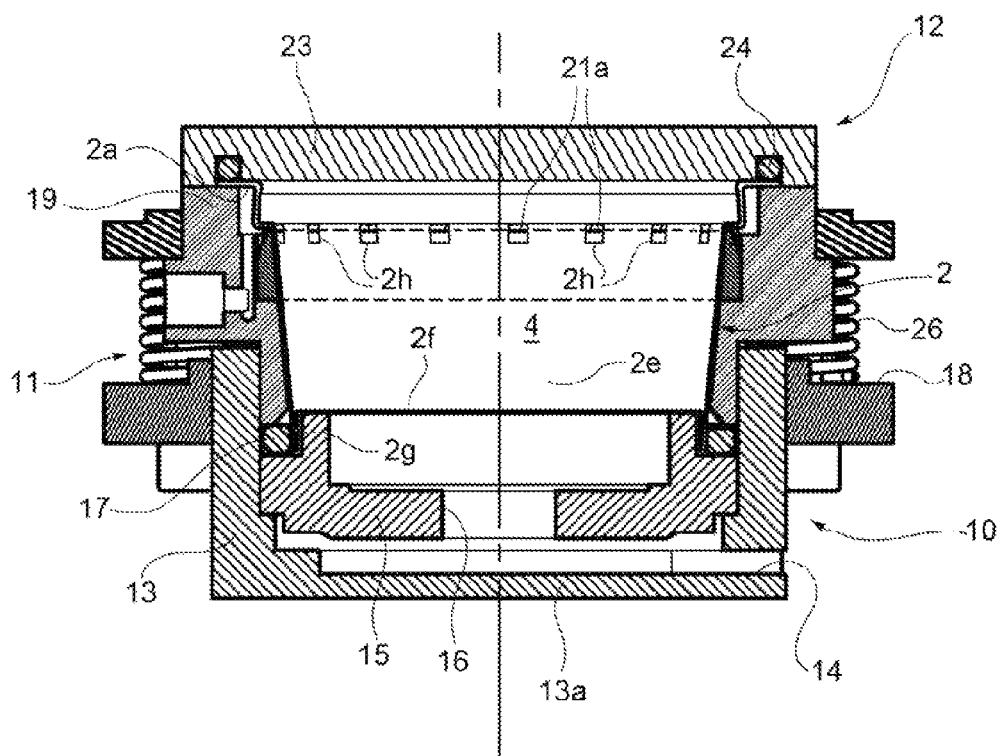

The arrangement is such that, in the operating sequence partially illustrated in FIGS. 10 to 12, the cutting edge 21a of the annular knife 21 is arranged initially underneath the projections 2h of the body 2 of the capsule 1 (FIG. 10) and then moves into the vicinity of their bottom edge (FIG. 11) and then, following the further and final displacement of the retaining element 19 towards the cup-shaped body 13, its cutting edge 21a tears simultaneously all the aforementioned projections 2h, thus forming a plurality of openings through which the pressurized hot water may penetrate inside the capsule via the ducts 30 and 31.

Otherwise, the structure and operating modes of the infusion assembly G according to FIGS. 8 to 12 correspond to that described above in connection with the assembly shown in FIGS. 2 to 6.

Figure 13:
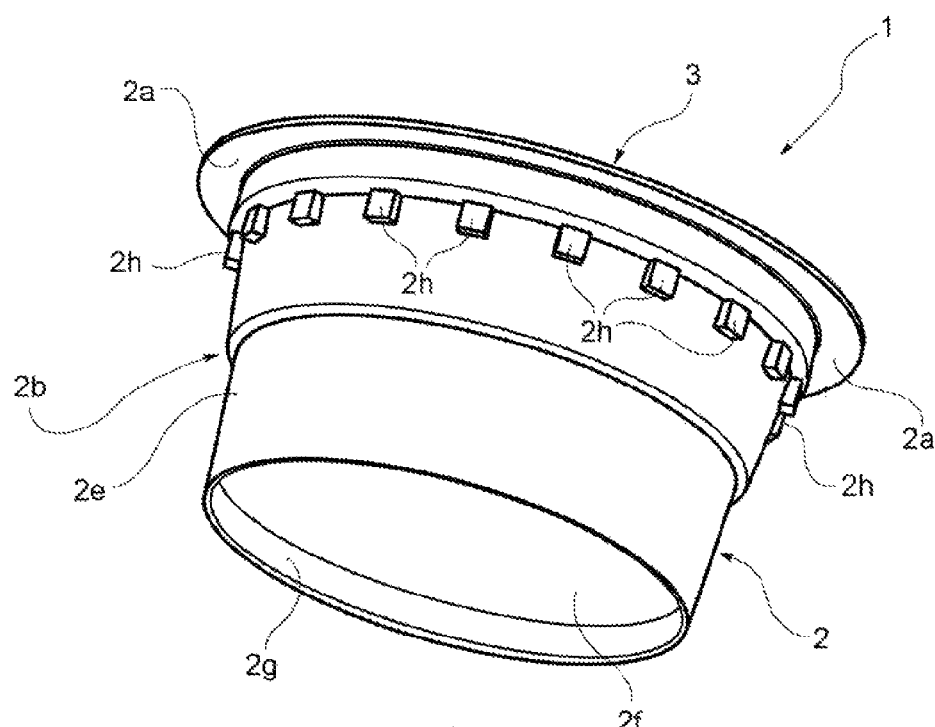
FIG. 13 is a perspective view of a further type of capsule which can be used in a system for the preparation of beverages according to the present invention.
Figure 14:
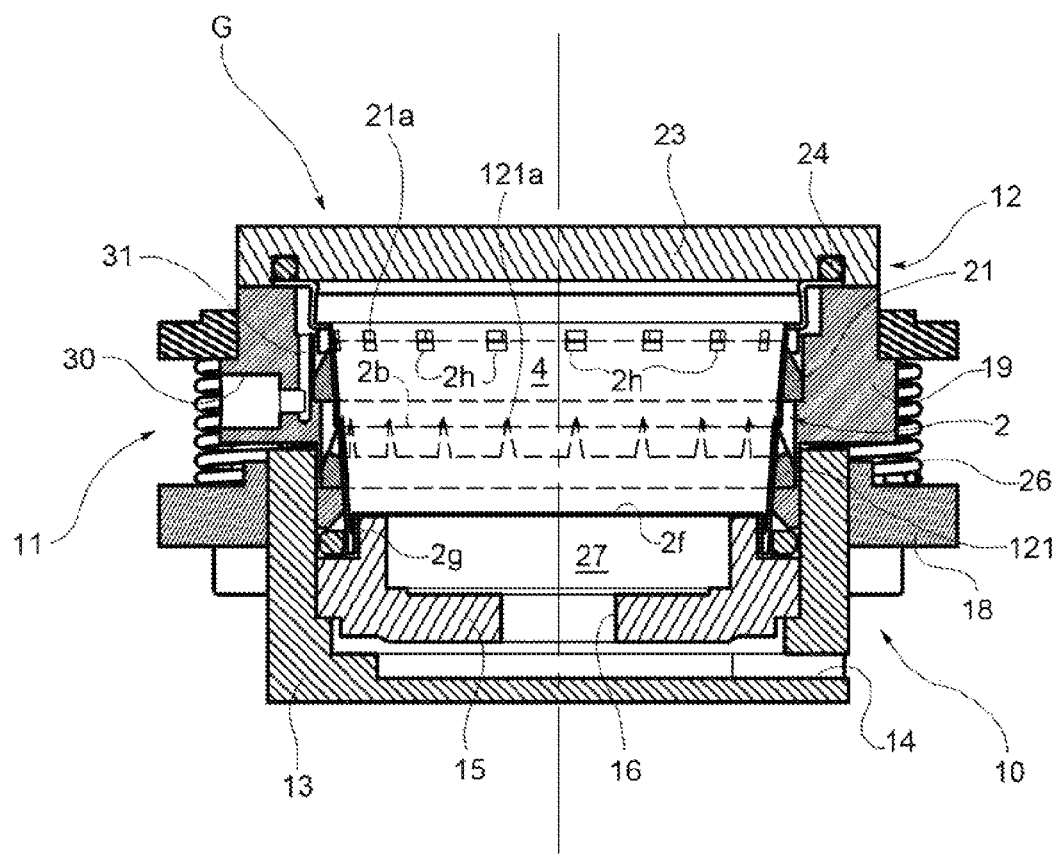
FIG. 14 is a cross-sectional view of an infusion assembly for using a capsule of the type shown in FIG. 13.

FIGS. 13 and 14 show a further variation of an embodiment of a system according to the present invention.

In these figures, parts and elements already described have again been assigned the same reference numbers and letters used previously.

In the variant described in FIG. 13, the capsule 1 has a cup-shaped body 2, the side wall of which has in the middle zone a circumferential formation 2b which transversely protrudes towards the outside and which is similar to the formation 2b of the capsule according to FIG. 1.

The side wall of the body 2 of the capsule 1 shown in FIG. 13 also has a circumferential ring-like arrangement of further formations 2h transversely protruding towards the outside, in the manner of cells, and angularly spaced, like the capsule shown in FIG. 7.

In the exemplary embodiment shown in FIG. 13, the protruding formations 2h are arranged between the formation 2b and the flange 2a of the body 2 of the capsule.

Moreover, it is possible to form the capsule 1 in such a way that the positions of the formations 2h and 2b are inverted with respect to the arrangement shown in FIG. 13.

FIG. 14 shows an infusion assembly G for use in combination with capsules of the type shown in FIG. 13.

Figure 3:
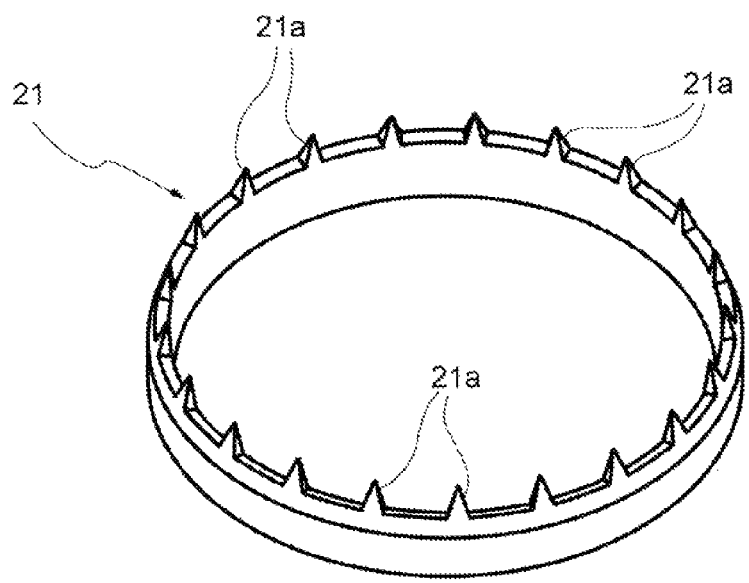
FIG. 3 is a perspective view of an annular perforation member which can be used in the infusion assembly according to FIG. 2.

The infusion assembly G according to FIG. 14 differs from those described above simply in that it comprises two annular perforation members, denoted by 21 and 121 respectively, the former corresponding to the annular knife shown in FIG. 9 and the latter corresponding to the annular perforation member according to FIG. 3.

The perforation members 21 and 121 of the assembly according to FIG. 14 are brought by the retaining element 19 into respective positions which are axially staggered so that the circular cutting edge 21a of the perforation member 21 is able to tear the protruding portions 2h, while the tips or teeth 121a of the perforation member 121 are able to produce a plurality of tears in the circumferential protruding formation 2b of the capsule 1.

Two pluralities of openings are thus formed in the side wall of the capsule, so as to allow the effective introduction of pressurized hot water inside it.

Obviously, without affecting the principle of the invention, the embodiments and the constructional details may be significantly modified with respect to that described and illustrated purely by way of a non-limiting example, without thereby departing from the scope of the invention as defined in the accompanying claims.

The invention claimed is:

1. A system for the preparation of beverages comprising in combination:
    a capsule (1) comprising a casing (2, 3) having first and second end walls (3, 2f) interconnected by an annular side wall (2e), and containing an amount or dose of a substance for preparation of the beverage; the side wall of the capsule (1) having at least one portion (2b; 2h) which protrudes transversely radially outwardly; and
    a machine (M) comprising
    an infusion assembly (G) designed to receive the capsule (1) and having, associated therewith, inflow passage (30, 31) for supplying a flow of pressurized water to be introduced into the capsule (1), and an outflow passage for outflow of the beverage formed in the infusion assembly (G) towards a collecting container;
    the infusion assembly (G) including a plurality of parts (10-12) which can be moved away from and towards each other and can be sealingly coupled together so as to define as a whole an infusion chamber into which the capsule (1) can be introduced;
    in at least one (11) of said parts (10-12) of the infusion assembly (G) there being provided a perforator (21; 121) designed to perforate the capsule (1) arranged in said chamber (20, 22);
    wherein
    the infusion assembly (G) is configured such that the infusion chamber (20, 22) is able to define, with respect to the capsule (1) positioned therein, an annular interspace or gap (20, 22) in which said at least one transversely protruding portion (2b; 2h) of the side wall of the capsule (1) extends; said annular interspace or gap (20, 22) being able to be connected to the inflow passage (30, 31) and being separated in a liquid-tight manner from the outflow passage (14);

and said perforator comprise an annular perforation member (21; 121) which in the closed condition of the infusion chamber (20, 22) extends into said interspace or gap (20, 22) and is designed to cause a tear in said at least one transversely protruding portion (2b; 2h) of the wall of the capsule (1) contained inside said chamber (20, 22), such that a flow of pressurized water can be introduced into the capsule (1) through said interspace or gap (20, 22) and said at least one tear.

2. The system according to claim 1, wherein the side wall of the capsule (1) has a formation (2b) which protrudes transversely radially outwardly and extends circumferentially over the entire periphery thereof, and the perforator of the machine (M) comprise an annular perforation member (21) having a plurality of protruding lugs or cutting teeth (21a) which are angularly spaced and designed to cause a corresponding plurality of tears in said circumferential formation (2b) of the side wall of the capsule (1).

3. The system according to claim 1, wherein the side wall of the capsule (1) has a plurality of formations (2h) transversely protruding, in the manner of cells angularly spaced along the periphery thereof, and the perforator (21) comprise an annular knife (21) having a circumferential cutting edge (21a) designed to tear said protruding formations (2h).

4. The system according to claim 2, wherein the side wall of the capsule (1) has a circumferential formation (2b) transversely protruding radially outwardly and, in an axially spaced relationship therewith, a circumferential arrangement of further formations (2h) protruding transversely, in the manner of angularly spaced cells, and the perforator (121, 21) comprise first and second annular perforation members (121, 21), axially staggered with respect to each other; the first perforation member (121) having a plurality of protruding lugs or cutting teeth (121a) which are angularly spaced and designed to cause a corresponding plurality of tears in the circumferential formation (2b) of the side wall of the capsule (1); the second annular perforation member comprising an annular knife (21) having a circumferential cutting edge (21a) designed to tear the aforementioned plurality of protruding formations (2h).

5. The system according to claim 1, wherein the part (10) of the infusion assembly (G) associated with the outflow passage (14) has a sealing ring (17) which is made of deformable material and on the inside of which a portion (2g) of the capsule (1) is introduced when the infusion chamber (20, 22) is closed, and wherein another cooperating part (11) of the infusion assembly (G) comprises a formation (19a, 19b) which, when said chamber (20, 22) is closed, is able to interfere with said sealing ring (17) so as to deform it radially towards the axis thereof, against the outer surface of said portion (2g) of the capsule (1), so as to separate the infusion chamber (20, 22) from the outflow passage.

6. A machine (M) for preparing a beverage using a capsule (1) comprising a casing (2, 3) having first and second end walls (3, 2f) interconnected by an annular side wall (2e), and containing an amount or dose of a substance for preparing the beverage; the side wall of the capsule (1) having at least one portion (2b; 2h) which transversely protrudes radially outwardly;

the machine (M) comprising an infusion assembly (G) designed to receive the capsule (1) and having, associated therewith, an inflow passage for supplying a flow of pressurized water intended to be introduced into the capsule (1), and outflow passage (14) for outflow of the beverage formed in the brewing assembly (G) towards a collecting container;

the infusion assembly (G) including a plurality of parts (10-12) which can be moved away from and towards each other and can be sealingly coupled together so as to define as a whole an infusion chamber in which the capsule (1) can be introduced;

in at least one (11) of said parts (10-12) of the infusion assembly (G) there being provided a perforator (21; 121) designed to perforate the capsule (1) arranged in said chamber (20, 22);

wherein the infusion assembly (G) is configured such that the infusion chamber (20, 22) is able to define, with respect to the capsule (1) positioned therein, an annular interspace or gap (20, 22) in which said at least one transversely protruding portion (2b; 2h) of the side wall of the capsule (1) extends; said annular interspace or gap (20, 22) being able to be connected to the inflow passage (30, 31) and being separated in a liquid-tight manner from the outflow passage (14);

and said perforator comprise an annular perforation member (21; 121) which in the closed condition of the infusion chamber (20, 22) extends into said interspace or gap (20, 22) and is designed to cause a tear in said at least one transversely protruding portion (2b; 2h) of the wall of capsule (1) contained inside said chamber (20, 22), such that a flow of pressurized water can be introduced into the capsule (1) through said interspace or gap (20, 22) and said at least one tear.

7. The machine according to claim 6, for use with the capsule (1), the side wall of which has a formation (2b) which protrudes transversely towards the outside and extends circumferentially over the entire periphery thereof, the perforator of the machine (M) comprising an annular perforation member (21) having a plurality of protruding lugs or cutting teeth (21a) which are angularly spaced and designed to cause a corresponding plurality of tears in said circumferential formation (2b) of the side wall of the capsule (1).

8. The machine according to claim 6, for use with the capsule (1), the side wall of which has a ring-like arrangement of formations (2h) transversely protruding towards the outside, in the manner of cells angularly spaced along the periphery thereof, the aforementioned perforator (21) comprising an annular knife (21) having a circumferential cutting edge (21a) designed to tear said protruding formations (2h).

9. The machine according to claim 7, for use with the capsule (1), the side wall of which has a circumferential formation (2b) transversely protruding towards the outside and, in an axially spaced relationship, a circumferential ring-like arrangement of further formations (2h) protruding transversely towards the outside, in the manner of angularly spaced cells, the perforator (121, 21) comprising first and second annular perforation members (121, 21) axially staggered with respect to one another; the first perforation member (121) having a plurality of protruding lugs or cutting teeth (121a) which are angularly spaced and designed to cause a corresponding plurality of tears in the aforementioned circumferential formation (2b) of the side wall of the capsule (1); the second annular perforation member comprising an annular knife (21) having a circumferential cutting edge (21*a*) designed to tear the aforementioned plurality of protruding formations (2*h*).

10. The machine according to claim 6, wherein the part (10) of the infusion assembly (G) associated with the outflow passage (14) has a sealing ring (17) which is made of deformable material and on the inside of which a portion (2*g*) of the capsule (1) is introduced when the infusion chamber (20, 22) is closed, and wherein another cooperating part (11) of the infusion assembly (G) comprises a formation (19*a*, 19*b*) which, when said chamber (20, 22) is closed, is able to interfere with said sealing ring (17) so as to deform it radially towards the axis thereof, against the outer surface of said portion (2*g*) of the capsule (1), so as to separate the infusion chamber (20, 22) from the outflow passage.

* * * * *